United States Patent
Goel et al.

(10) Patent No.: US 11,930,083 B2
(45) Date of Patent: Mar. 12, 2024

(54) METHODS, SYSTEMS, AND COMPUTER READABLE MEDIA FOR PROCESSING NETWORK FUNCTION (NF) DISCOVERY REQUESTS AT NF REPOSITORY FUNCTION (NRF) USING PRIORITIZED LISTS OF PREFERRED LOCATIONS

(71) Applicant: Oracle International Corporation, Redwood Shores, CA (US)

(72) Inventors: Yesh Goel, Bangalore (IN); Sridhar Karuturi, Raleigh, NC (US); Ahmed M. Akl, Little Elm, TX (US); Doki Satish Kumar Patro, Bangalore (IN); Amarnath Jayaramachar, Bangalore (IN)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 0 days.

(21) Appl. No.: 17/397,968

(22) Filed: Aug. 9, 2021

(65) Prior Publication Data
US 2023/0052267 A1    Feb. 16, 2023

(51) Int. Cl.
H04L 67/51    (2022.01)
H04W 84/04   (2009.01)

(52) U.S. Cl.
CPC ........... *H04L 67/51* (2022.05); *H04W 84/042* (2013.01)

(58) Field of Classification Search
CPC ....... H04L 67/51; H04L 67/30; H04W 84/042
See application file for complete search history.

(56) References Cited

U.S. PATENT DOCUMENTS 6,014,558 A    1/2000 Thomas
8,069,101 B1  11/2011 von Groll et al.
(Continued)

FOREIGN PATENT DOCUMENTS

CN    105814931 A    7/2016
CN    114039874 A    2/2022
(Continued)

OTHER PUBLICATIONS

Notification of Transmittal of the International Search Report and the Written Opinion of the International Searching Authority, or the Declaration for International Application No. PCT/US2021/033031 (dated May 18, 2021).
(Continued)

*Primary Examiner* — Kevin T Bates
*Assistant Examiner* — Ranjan Pant
(74) *Attorney, Agent, or Firm* — Jenkins, Taylor & Hunt, P.A.

(57) ABSTRACT

A method for processing NF discovery requests using prioritized lists of preferred locations includes maintaining an NF profiles database including NF profiles of producer NFs registered to provide service to other NFs and a preferred locality attribute mappings database including mappings between preferred locality attributes and prioritized lists of preferred locations. The method includes receiving, from an NF, an NF discovery request including query parameters and a preferred locality attribute. The method further includes accessing the preferred locality attribute mappings database using the preferred locality attribute and obtaining a prioritized list of preferred locations corresponding to the preferred locality attribute, accessing the NF profiles database using the query parameters and identifying NF profiles of producer NFs capable of providing a service indicated by the query parameters, and prioritizing the NF profiles according
(Continued)

to the prioritized list of preferred locations. An NF discovery response is generated and transmitted to the NF.

8 Claims, 8 Drawing Sheets

(56) References Cited

U.S. PATENT DOCUMENTS

| | | |
|---|---|---|
| 8,069,181 B1 | 11/2011 | Krishan et al. |
| 9,124,537 B2 | 9/2015 | Kolze |
| 9,246,762 B1 | 1/2016 | Watkins |
| 10,313,362 B2 | 6/2019 | Ahuja et al. |
| 10,609,530 B1 | 3/2020 | Patil et al. |
| 10,637,753 B1 | 4/2020 | Taft et al. |
| 10,686,667 B1 | 6/2020 | Subramaniam |
| 10,772,062 B1 | 9/2020 | Albasheir et al. |
| 11,109,307 B2 | 8/2021 | Bartolome Rodrigo et al. |
| 11,271,846 B2 | 3/2022 | Krishan |
| 11,470,544 B2 | 10/2022 | Singh et al. |
| 11,483,694 B2 | 10/2022 | Krishan |
| 11,496,954 B2 | 11/2022 | Gupta et al. |
| 11,528,334 B2 | 12/2022 | Krishan |
| 11,570,262 B2 | 1/2023 | Sapra et al. |
| 11,589,298 B2 | 2/2023 | Sapra et al. |
| 11,652,895 B1 | 5/2023 | Sapra et al. |
| 2005/0181776 A1 | 8/2005 | Verma et al. |
| 2005/0193096 A1 | 9/2005 | Yu et al. |
| 2006/0010224 A1 | 1/2006 | Sekar et al. |
| 2007/0050331 A1 | 3/2007 | Bauman et al. |
| 2008/0101293 A1 | 5/2008 | Woo et al. |
| 2009/0222584 A1 | 9/2009 | Josefsberg et al. |
| 2013/0080641 A1 | 3/2013 | Lui et al. |
| 2013/0086245 A1 | 4/2013 | Lu et al. |
| 2013/0198269 A1 | 8/2013 | Fleischman et al. |
| 2013/0272123 A1 | 10/2013 | Lee et al. |
| 2014/0040975 A1 | 2/2014 | Raleigh et al. |
| 2016/0156513 A1 | 6/2016 | Zhang et al. |
| 2016/0350683 A1 | 12/2016 | Bester et al. |
| 2016/0380906 A1 | 12/2016 | Hodique et al. |
| 2017/0077751 A1 | 3/2017 | Forbes |
| 2017/0221015 A1 | 8/2017 | June et al. |
| 2018/0205637 A1 | 7/2018 | Li |
| 2018/0262625 A1 | 9/2018 | McCarley et al. |
| 2018/0285794 A1 | 10/2018 | Gray-Donald et al. |
| 2018/0324247 A1 | 11/2018 | Hood et al. |
| 2019/0007366 A1* | 1/2019 | Voegele ............ H04L 61/4511 |
| 2019/0140895 A1 | 5/2019 | Ennis, Jr. et al. |
| 2019/0158364 A1 | 5/2019 | Zhang et al. |
| 2019/0166001 A1 | 5/2019 | Ma et al. |
| 2019/0212802 A1 | 7/2019 | Srinivasan et al. |
| 2019/0222633 A1 | 7/2019 | Howes et al. |
| 2019/0230556 A1 | 7/2019 | Lee |
| 2019/0342229 A1 | 11/2019 | Khinvasara et al. |
| 2019/0394284 A1 | 12/2019 | Baghel et al. |
| 2020/0036754 A1* | 1/2020 | Livanos ............... H04W 48/16 |
| 2020/0059420 A1 | 2/2020 | Abraham |
| 2020/0106812 A1 | 4/2020 | Verma et al. |
| 2020/0127916 A1* | 4/2020 | Krishan ............... H04L 47/125 |
| 2020/0136911 A1 | 4/2020 | Assali et al. |
| 2020/0137174 A1 | 4/2020 | Stammers et al. |
| 2020/0305033 A1 | 9/2020 | Keller et al. |
| 2020/0314615 A1 | 10/2020 | Patil et al. |
| 2020/0336554 A1 | 10/2020 | Deshpande et al. |
| 2020/0367148 A1 | 11/2020 | Baek et al. |
| 2021/0007023 A1 | 1/2021 | Umapathy et al. |
| 2021/0044481 A1 | 2/2021 | Xu et al. |
| 2021/0076248 A1 | 3/2021 | Kallam et al. |
| 2021/0099856 A1 | 4/2021 | Cakulev et al. |
| 2021/0136602 A1 | 5/2021 | Pokkunuri et al. |
| 2021/0168055 A1 | 6/2021 | Lair |
| 2021/0204200 A1 | 7/2021 | Krishan et al. |
| 2021/0235254 A1 | 7/2021 | Farooq |
| 2021/0273977 A1 | 9/2021 | Karasaridis et al. |
| 2021/0274392 A1 | 9/2021 | Dao et al. |
| 2021/0297935 A1 | 9/2021 | Belling et al. |
| 2021/0367916 A1 | 11/2021 | Belling et al. |
| 2021/0368427 A1 | 11/2021 | Rommer et al. |
| 2021/0385286 A1 | 12/2021 | Wang et al. |
| 2021/0385732 A1 | 12/2021 | Reyes et al. |
| 2022/0038545 A1 | 2/2022 | Krishan |
| 2022/0039101 A1* | 2/2022 | Wang ................ H04W 52/0206 |
| 2022/0070648 A1 | 3/2022 | Krishan |
| 2022/0103644 A1 | 3/2022 | Park et al. |
| 2022/0110082 A1 | 4/2022 | Belling et al. |
| 2022/0131945 A1 | 4/2022 | Sapra et al. |
| 2022/0159464 A1 | 5/2022 | Rajput et al. |
| 2022/0191294 A1 | 6/2022 | Yang et al. |
| 2022/0264432 A1* | 8/2022 | Reyes .................. H04W 76/11 |
| 2022/0286949 A1 | 9/2022 | Sapra et al. |
| 2022/0295384 A1 | 9/2022 | Gupta et al. |
| 2022/0330085 A1 | 10/2022 | Li |
| 2022/0346188 A1* | 10/2022 | Malhotra ............... H04L 67/51 |
| 2022/0394453 A1 | 12/2022 | Goel |
| 2022/0394597 A1 | 12/2022 | Goel |
| 2022/0417783 A1 | 12/2022 | Srivastava et al. |
| 2023/0096969 A1 | 3/2023 | Sapra et al. |
| 2023/0099676 A1 | 3/2023 | Jayaramachar et al. |
| 2023/0179681 A1 | 6/2023 | Krishan |

FOREIGN PATENT DOCUMENTS

| | | | |
|---|---|---|---|
| CN | 112584371 B | 5/2022 | |
| EP | 3 716 692 A1 | 9/2020 | |
| KR | 20190057818 A | 5/2019 | |
| KR | 20190088060 A | 7/2019 | |
| KR | 20220006908 A | 1/2022 | |
| WO | WO 2019/144321 A1 | 1/2019 | |
| WO | WO 2019/076276 A1 | 4/2019 | |
| WO | WO 2019/215308 A1 | 11/2019 | |
| WO | WO 2020/001842 A1 | 1/2020 | |
| WO | WO 2020/030291 A1 | 2/2020 | |
| WO | WO-2020083516 A1 * | 4/2020 | ............ H04L 67/16 |
| WO | WO 2020/192254 A1 | 10/2020 | |
| WO | WO 2021/011933 A1 | 1/2021 | |
| WO | WO 2021/092441 A1 | 5/2021 | |
| WO | WO-2021110287 A1 * | 6/2021 | |
| WO | WO 2021219385 A1 | 11/2021 | |
| WO | WO 2022/025987 A1 | 2/2022 | |
| WO | WO 2022/050987 A1 | 3/2022 | |
| WO | WO 2022/093319 A1 | 5/2022 | |
| WO | WO-2022152870 A1 * | 7/2022 | |
| WO | WO 2022/179713 A1 | 9/2022 | |
| WO | WO 2022/197531 A1 | 9/2022 | |
| WO | WO 2022/256306 A1 | 12/2022 | |

OTHER PUBLICATIONS

Non-Final Office Action for U.S. Appl. No. 16/945,794 (dated Sep. 15, 2021).

Commonly-assigned, co-pending U.S. Appl. No. 17/468,076 for "Methods, Systems, and Computer Readable Media for Using Service Communications Proxy (SCP) or Security Edge Protection Proxy (SEPP) to Apply or Override Preferred-Locality Attribute During Network Function (NF) Discovery" (Unpublished, filed Sep. 7, 2021).

Notification of Transmittal of the International Search Report and the Written Opinion of the International Searching Authority, or the Declaration for International Application No. PCT/US2021/024000 (dated Jun. 24, 2021).

Non-Final Office Action for U.S. Appl. No. 16/356,446 (dated Jun. 16, 2021).

Commonly-assigned, co-pending U.S. Appl. No. 17/337,356 for "Methods, Systems, and Computer Readable Media for Applying or Overriding Preferred Locality Criteria in Processing Network Function (NF) Discovery Requests," (Unpublished, filed Jun. 2, 2021).

Notification of Transmittal of the International Search Report and the Written Opinion of the International Searching Authority, or the Declaration for U.S. Patent Application Serial No. PCT/US2021/020120 (dated Jun. 1, 2021).

"3rd Generation Partnership Project; Technical Specification Group Core Network and Terminals; 5G System; Technical Realization of

(56) References Cited

OTHER PUBLICATIONS

Service Based Architecture; Stage 3 (Release 17)," 3GPP TS 29.500, V17.2.0, pp. 1-100 (Mar. 2021).
"3rd Generation Partnership Project; Technical Specification Group Services and System Aspects; Security architecture and procedures for 5G system (Release 17)," 3GPP TS 33.501, V17.1.0, pp. 1-256 (Mar. 2021).
"3rd Generation Partnership Project; Technical Specification Group Core Network and Terminals; 5G System; Public Land Mobile Network (PLMN) Interconnection; Stage 3 (Release 17)," 3GPP TS 29.573, V17.0.0, pp. 1-100 (Mar. 2021).
Commonly-assigned, co-pending U.S. Appl. No. 17/203,693 for "Methods, Systems, and Computer Readable Media for Hypertext Transfer Protocol (HTTP) Stream Tuning for Load and Overload Control," (Unpublished, filed Mar. 16, 2021).
Commonly-assigned, co-pending U.S. Appl. No. 17/200,777 for "Methods, Systems, and Computer Readable Media for Supporting Multiple Preferred Localities for Network Function (NF) Discovery and Selection Procedures" (Unpublished, filed Mar. 13, 2021).
Advisory Action for U.S. Appl. No. 16/356,446 (dated Dec. 22, 2020).
Commonly-assigned, co-pending U.S. Appl. No. 17/082,871 for "Methods, Systems, and Computer Readable Media for Rank Processing for Network Function Selection," (Unpublished, filed Oct. 28, 2020).
Final Office Action for U.S. Appl. No. 16/356,446 (dated Sep. 8, 2020).
Commonly-assigned, co-pending U.S. Appl. No. 17/009,725 for "Methods, Systems, and Computer Readable Media for Service Communications Proxy (SCP)-Specific Prioritized Network Function (NF) Discovery and Routing," (Unpublished, filed Sep. 1, 2020).
Commonly-assigned, co-pending U.S. Appl. No. 16/945,794 for "Methods, Systems, and Computer Readable Media for Preferred Network Function (NF) Location Routing Using Service Communications Proxy (SCP)," (Unpublished, filed Jul. 31, 2020).
"3rd Generation Partnership Project; Technical Specification Group Core Network and Terminals; 5G System; Network Function Repository Services; Stage 3 (Release 16)," 3GPP TS 29.510 V16.4.0, pp. 1-206 (Jul. 2020).
"3rd Generation Partnership Project; Technical Specification Group Services and System Aspects; Procedures for the 5G System (5GS); Stage 2 (Release 16)," 3GPP TS 23.502 V16.4.0, pp. 1-582 (Mar. 2020).
"3rd Generation Partnership Project; Technical Specification Group Services and System Aspects; System architecture for the 5G System (5GS); Stage 2 (Release 16)," 3GPP TS 23.501 V16.4.0, pp. 1-430 (Mar. 2020).
Non-Final Office Action for U.S. Appl. No. 16/356,446 (dated May 11, 2020).
Nokia et al., "Discussion paper on authorization for Model D Indirect communications", 3GPP TSG SA WG3; S3-194380 (Nov. 11, 2019).
Commonly-assigned, co-pending U.S. Appl. No. 16/356,446 for "Methods, Systems, and Computer Readable Media for Locality-Based Selection and Routing of Traffic to Producer Network Functions (NFs)," (Unpublished, filed Mar. 18, 2019).
Fielding et al. "Hypertext Transfer Protocol (HTTP/1.1): Semantics and Content", Internet Engineering Taskforce (IETF) Request for Comments: 7231, IEFT RFC 7231, pp. 1-102 (Jun. 2014).
Notice of Allowance and Fee(s) Due for U.S. Appl. No. 17/082,871 (dated Sep. 28, 2022).
Notification of Transmittal of the International Search Report and the Written Opinion of the International Searching Authority, or the Declaration for International Application No. PCT/US2022/031566 (dated Sep. 2, 2022).
Examiner-Initiated Interview Summary for U.S. Appl. No. 17/672,639 (dated Aug. 10, 2022).
Notice of Allowance and Fee(s) Due for U.S. Appl. No. 16/945,794 (dated Aug. 2, 2022).
Non-Final Office Action for U.S. Appl. No. 17/672,639 (dated Aug. 25, 2022).
Notice of Allowance for U.S. Appl. No. 17/200,777 (dated Jun. 30, 2022).
Final Office Action for U.S. Appl. No. 17/082,871 (dated Jun. 6, 2022).
Notice of Allowance for U.S. Appl. No. 17/009,725 (dated Jun. 13, 2022).
Commonly-assigned, co-pending U.S. Appl. No. 17/672,639 for "Methods, Systems, and Computer Readable Media for Dynamic Optimized Network Function Discovery for Consumer Network Functions" (Unpublished, filed Feb. 5, 2022).
"3rd Generation Partnership Project; Technical Specification Group Core Network and Terminals; 5G System; Network Function Repository Services, Stage 3 (Release 16)," 3GPP TS 29.510, V16.6.0, pp. 1-227 (Jan. 2021).
Notification of Transmittal of the International Search Report and the Written Opinion of the International Searching Authority, or the Declaration for International Application No. PCT/US2022/019848 (dated Jun. 14, 2022).
Advisory Action and Examiner-Initiated Interview Summary for U.S. Appl. No. 16/945,794 (dated May 20, 2022).
Final Office Action for U.S. Appl. No. 16/945,794 (dated Feb. 8, 2022).
Non-Final Office Action for U.S. Appl. No. 17/082,871 (dated Feb. 7, 2022).
Commonly-assigned, co-pending U.S. Appl. No. 17/356,461 for "Methods, Systems and Computer Readable Media for Optimizing Network Traffic Distribution using Timeslot-Based Tracked Producer Network Function (NF) Performance During Producer NF Selection" (Unpublished, filed Jun. 23, 2021).
Commonly-assigned, Co-pending U.S. Appl. No. 17/337,356 for "Methods, Systems, and Computer Readable Media for Applying or Overriding Preferred Locality Criteria in Processing Network Function (NF) Discovery Requests," (Unpublished, filed Jun. 6, 2021).
"3rd Generation Partnership Project; Technical Specification Group Core Network and Terminals; Numbering, addressing and identification; (Release 17)," 3GPP TS 23.003, V17.1.0, pp. 1-143 (Mar. 2021).
"3rd Generation Partnership Project; Technical Specification Group Core Network and Terminals; 5G System; Session Management Services; Stage 3 (Release 17)," 3GPP 29.502, V17.1.0, pp. 1-299 (Jun. 2021).
"3rd Generation Partnership Project; Technical Specification Group Core Network and Terminals; 5G System; Principles and Guidelines for Services Definition; Stage 3 (Release 17)," 3GPP TS 29.501, V17.2.0, pp. 1-78 (Jun. 2021).
"3rd Generation Partnership Project; Technical Specification Group Services and System Aspects; Procedures for the 5G System (5GS); Stage 2 (Release 17)," 3GPP TS 23.502, V17.0.0, pp. 1-646 (Mar. 2021).
Vixie et al., "Dynamic Updates in the Domain Name System (DNS Update)," Network Working Group, RFC 2136, pp. 1-26 (Apr. 1997).
"3rd Generation Partnership Project; Technical Specification Group Core Network and Terminals; 5G System; Network Function Repository Services; Stage 3 (Release 17)," 3GPP TS 29.510, V17.1.0, pp. 1-243 (Mar. 2021).
"3rd Generation Partnership Project; Technical Specification Group Services and System Aspects; System architecture for the 5G System (5GS); Stage 2 (Release 17)," 3GPP TS 23.501, V17.0.0, pp. 1-489 (Mar. 2021).
Commonly-assigned, co-pending U.S. Appl. No. 17/485,284 for Methods, Systems and Computer Readable Media for Providing Priority Resolver for Resolving Priorities and Network Function (NF) Instances (Unpublished, filed Sep. 24, 2021).
Notice of Allowance and Fee(s) Due for U.S. Appl. No. 16/356,446 (dated Sep. 30, 2021).
Commonly-assigned, co-pending U.S. Appl. No. 17/487,142 for "Methods, Systems, and Computer Readable Media for Network Function Discovery Using Preferred-Locality Information" (Unpublished, filed Sep. 28, 2021).

(56) References Cited

OTHER PUBLICATIONS

Non-Final Office Action for U.S. Appl. No. 17/543,989 (dated Mar. 28, 2023).
Notice of Allowance for U.S. Appl. No. 17/672,639 dated Mar. 20, 2023.
Examiner-Initiated Interview Summary for U.S. Appl. No. 17/672,639 (dated Mar. 7, 2023).
Non-Final Office Action for U.S. Appl. No. 17/337,356 (dated Jan. 17, 2023).
Examination_Report for Patent Application No. IN202147036462 (dated Dec. 29, 2022) 1322/623 PCT/IN.
Notice of Publication for U.S. Appl. No. 17/356,461 (dated Dec. 29, 2022).
Ex Parte Quayle Action for U.S. Appl. No. 17/672,639 (dated Dec. 23, 2022).
Notice of Publication for International Application Serial No. PCT/US2022/031566 (dated Dec. 8, 2022).
"3rd Generation Partnership Project; Technical Specification Group Core Network and Terminals; 5G System; Network Function Repository Services; Stage 3 (Release 17)," 3GPP TS 29.510, V17.4.0, pp. 1-284 (Dec. 2021).
Examiner-Initiated Interview Summary for U.S. Appl. No. 17/337,356 dated May 2, 2023.
Non-Final Office Action for U.S. Appl. No. 17/468,076 (dated Apr. 28, 2023).
Applicant-Initiated Interview Summary for U.S. Appl. No. 17/543,989 (dated Jul. 24, 2023).
Final Office Action for U.S. Appl. No. 17/337,356 (dated Jun. 26, 2023).
Notice of Publication for European Patent Application Serial No. 21718460.5 (dated Jun. 14, 2023).
First Examination Report for Indian Patent Application Serial No. 202247065596 (dated May 30, 2023).
Notice of Publication for European Patent Application No. 21713526.8 (dated May 10, 2023).
Non-Final Office Action for U.S. Appl. No. 17/487,142 (dated May 8, 2023).
Examiner-Initiated Interview Summary for U.S. Appl. No. 17/672,639 (dated Apr. 21, 2023).
Notice of Allowance and Fee(s) Due for U.S. Appl. No. 17/337,356 (dated Sep. 14, 2023).
Notice of Allowance and Fee(s) Due for U.S. Appl. No. 17/543,989 (dated Sep. 13, 2023).
Notice of Allowance and Fee(s) Due for U.S. Appl. No. 17/487,142 (dated Sep. 1, 2023).
Notice of Publication for European Patent Application Serial No. 21731870.8 (dated Aug. 9, 2023).
"$3^{rd}$ Generation Partnership Project; Technical Specification Group Core Network and Terminals; 5G System; Network Function Repository Services; Stage 3 (Release 18)" 3GPP TS 29.510, V18.4.0, pp. 1-373 (Sep. 2023).
Commonly-assigned, co-pending U.S. Appl. No. 18/519,982 for "Methods, Systems, and Computer Readable Media for Overriding a Preferred Locality Attribute Value Using Preferred Location Attribute Values and Traffic Distribution Attribute Values" (Unpublished, filed Nov. 27, 2023).
Office Action for Chinese Patent Application Serial No. 202180068287.X (dated Sep. 28, 2023).
Final Office Action for U.S. Appl. No. 17/468,076 (dated Oct. 5, 2023).
Applicant-Initiated Interview Summary for U.S. Appl. No. 17/468,076 (dated Sep. 22, 2023).

\* cited by examiner

METHODS, SYSTEMS, AND COMPUTER READABLE MEDIA FOR PROCESSING NETWORK FUNCTION (NF) DISCOVERY REQUESTS AT NF REPOSITORY FUNCTION (NRF) USING PRIORITIZED LISTS OF PREFERRED LOCATIONS

TECHNICAL FIELD

The subject matter described herein relates to processing NF discovery requests. More particularly, the subject matter described herein relates to methods, systems, and computer readable media for processing NF discovery requests at the NRF using prioritized lists of preferred locations.

BACKGROUND

In 5G telecommunications networks, a network function that provides service is referred to as a producer NF or NF service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name that resolves to an IP address and port number on a network node that hosts a producer NF. An NF instance is an instance of a producer NF that provides a service. A given producer NF may include more than one NF instance. It should also be noted that multiple NF instances can share the same service endpoint.

Producer NFs register with a network function repository function (NRF). The NRF maintains service profiles of available NF instances identifying the services supported by each NF instance. The terms "service profiles" and "NF profiles" are used interchangeably herein. Consumer NFs can subscribe to receive information about producer NF instances that have registered with the NRF.

In addition to consumer NFs, another type of network node that can subscribe to receive information about NF service instances is a service communications proxy (SCP). The SCP subscribes with the NRF and obtains reachability and service profile information regarding producer NF service instances. Consumer NFs connect to the service communications proxy, and the service communications proxy load balances traffic among producer NF service instances that provide the required services or directly routes the traffic to the destination producer NF instances.

In addition to the SCP, another example of an intermediate proxy node that routes traffic between producer and consumer NFs is the security edge protection proxy (SEPP). The SEPP is the network node used to protect control plane traffic that is exchanged between different 5G public land mobile networks (PLMNs). As such, the SEPP performs message filtering, policing and topology hiding for all application programming interface (API) messages that are transmitted between PLMNs.

One problem in 5G communications networks is that during NF discovery, a consumer NF may fail to discover and/or select the producer NF that is most optimized to provide a given service. NF discovery is the process through which a consumer NF sends a discovery request to the NRF to discover producer NFs to provide a service. The NRF that receives the NF discovery request may utilize query parameters in the NF discovery request to generate a prioritized list of NF profiles of producer NFs that match the query parameters. In generating the prioritized list, the NRF uses the registered priority of each producer NF and the preferred locality attribute, if present in the NF discovery request, to set the priorities of producer NF profiles returned to the consumer NF in the NF discovery response. For example, the NRF may prioritize producer NFs with localities that match the preferred locality attribute in the discovery request over producer NFs with localities that do not match the preferred locality attribute in the discovery request. If there are no producer NFs with localities that match the preferred locality attribute in the discovery request, the discovery response may prioritize producer NFs that are farther away from the consumer NF over producer NFs that are closer to the consumer NF. As a result, when selecting a producer NF from the list of producer NF profiles returned in the discovery response to provide a service, the consumer NF may select a producer NF that is farther away from the consumer NF than another producer NF, resulting in increased latency in service communications.

In light of these and other difficulties there exists a need for methods, systems, and computer readable media for improved processing of NF discovery requests at an NRF.

SUMMARY

A method for processing network function (NF) discovery requests using prioritized lists of preferred locations includes, at an NF repository function (NRF) including at least one processor, maintaining an NF profiles database including NF profiles of producer NFs registered to provide service to other NFs. The method further includes maintaining a preferred locality attribute mappings database including mappings between preferred locality attributes and prioritized lists of preferred locations. The method further includes receiving, from an NF, an NF discovery request including query parameters and a preferred locality attribute. The method further includes accessing the preferred locality attribute mappings database using the preferred locality attribute and obtaining a prioritized list of preferred locations corresponding to the preferred locality attribute. The method further includes accessing the NF profiles database using the query parameters and identifying NF profiles of producer NFs capable of providing a service indicated by the query parameters. The method further includes prioritizing the NF profiles according to the prioritized list of preferred locations. The method further includes generating an NF discovery response including the NF profiles prioritized according to the prioritized list of preferred locations. The method further includes transmitting the NF discovery response to the NF that transmitted the NF discovery request.

According to another aspect of the subject matter described herein, maintaining the preferred locality attribute mappings database includes maintaining the mappings per target NF type.

According to another aspect of the subject matter described herein, maintaining the preferred locality attribute mappings database includes storing a relative location preference indicator for each preferred location, where the relative location preference indicator indicates a relative preference of the location with respect to other locations in the list.

According to another aspect of the subject matter described herein, prioritizing the NF profiles includes modifying configured priorities of the NF profiles according to the relative location preference indicators in the list of mappings obtained using the preferred locality attribute in the NF discovery request.

According to another aspect of the subject matter described herein, modifying the configured priorities includes modifying values of priority attributes of NF profiles of producer NFs with locality attributes that match one of the preferred locations in the list to be lower than priority attribute values of NF profiles of producer NFs with locality attributes that do not match one of the preferred locations in the list.

According to another aspect of the subject matter described herein, modifying the configured priorities includes modifying values of priority attributes of the NF profiles of producer NFs with locality attributes that match the same preferred location consistently with the configured priorities of the NF profiles.

According to another aspect of the subject matter described herein, modifying the configured priorities includes modifying values of priority attributes of the NF profiles of producer NFs with locality attributes that match different ones of the preferred locations consistently with the relative location preference indicators of the different ones of the preferred locations.

According to another aspect of the subject matter described herein, the relative location preference indicators comprise one of: weight values, priority values, and location preference categories.

According to another aspect of the subject matter described herein, receiving the NF discovery request includes receiving an inter-public land mobile network (PLMN) NF discovery request.

According to another aspect of the subject matter described herein, receiving the NF discovery request includes receiving an intra-public land mobile network (PLMN) NF discovery request.

According to another aspect of the subject matter described herein, a system for processing network function (NF) discovery requests using prioritized lists of preferred locations is provided. The system includes an NF repository function (NRF) including at least one processor and a memory. The system further includes an NF profiles database stored in the memory and including NF profiles of producer NFs registered to provide service to other NFs. The system further includes a preferred locality attribute mappings database stored in the memory and including mappings between preferred locality attributes and prioritized lists of preferred locations. The system further includes an NF discovery request handler executable by the at least one processor for receiving, from an NF, an NF discovery request including query parameters and a preferred locality attribute, accessing the preferred locality attribute mappings database using the preferred locality attribute and obtaining a prioritized list of preferred locations corresponding to the preferred locality attribute, accessing the NF profiles database using the query parameters and identifying NF profiles of producer NFs capable of providing a service indicated by the query parameters, prioritizing the NF profiles according to the prioritized list of preferred locations, generating an NF discovery response including the NF profiles prioritized according to the prioritized list of preferred locations, and transmitting the NF discovery response to the NF that transmitted the NF discovery request.

According to another aspect of the subject matter described herein, the mappings in the preferred locality attribute mappings database include mappings between the preferred locality attribute and the prioritized lists of preferred locations per target NF type.

According to another aspect of the subject matter described herein, the prioritized lists of preferred locations in the preferred locality attribute mappings database include relative location preference indicators for the preferred locations, where the relative location preference indicators indicate relative preferences of the locations in the list.

According to another aspect of the subject matter described herein, in prioritizing the NF profiles, the NF discovery request handler is configured to modify configured priorities of the NF profiles according to the relative location preference indicators in the list of mappings obtained using the preferred locality attribute in the NF discovery request.

According to another aspect of the subject matter described herein, in prioritizing the NF profiles, the NF discovery request handler is configured to modify the configured priorities by modifying values of priority attributes of NF profiles of producer NFs with locality attributes that match one of the preferred locations in the list to be lower than priority attribute values of NF profiles of producer NFs with locality attributes that do not match one of the preferred locations in the list.

According to another aspect of the subject matter described herein, in prioritizing the NF profiles, the NF discovery request handler is configured to modify values of priority attributes of the NF profiles of producer NFs with locality attributes that match the same preferred location consistently with the configured priorities of the NF profiles.

According to another aspect of the subject matter described herein, in prioritizing the NF profiles, the NF discovery request handler is configured to modify values of priority attributes of the NF profiles of producer NFs with locality attributes that match different ones of the preferred locations consistently with the relative location preference indicators of the different ones of the preferred locations.

According to another aspect of the subject matter described herein, the relative location preference indicators comprise one of: weight values, priority values, and location preference categories.

According to another aspect of the subject matter described herein, the NF discovery request comprises an inter-public land mobile network (PLMN) NF discovery request or an intra-PLMN NF discovery request.

According to another aspect of the subject matter described herein, a non-transitory computer readable medium having stored thereon executable instructions that when executed by a processor of a computer control the computer to perform steps is provided. The steps are performed at a network function (NF) repository function (NRF). The steps include maintaining an NF profiles database including NF profiles of producer NFs registered to provide service to other NFs. The steps further include maintaining a preferred locality attribute mappings database including mappings between preferred locality attributes and prioritized lists of preferred locations. The steps further include receiving, from an NF, an NF discovery request including query parameters and a preferred locality attribute. The steps further include accessing the preferred locality attribute mappings database using the preferred locality attribute and obtaining a prioritized list of preferred locations corresponding to the preferred locality attribute. The steps further include accessing the NF profiles database using the query parameters and identifying NF profiles of producer NFs capable of providing a service indicated by the query parameters. The steps further include prioritizing the NF profiles according to the prioritized list of preferred locations. The steps further include generating an NF discovery response including the NF profiles prioritized according to the prioritized list of preferred locations. The steps further include transmitting the NF discovery response to the NF that transmitted the NF discovery request.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

Figure 1:
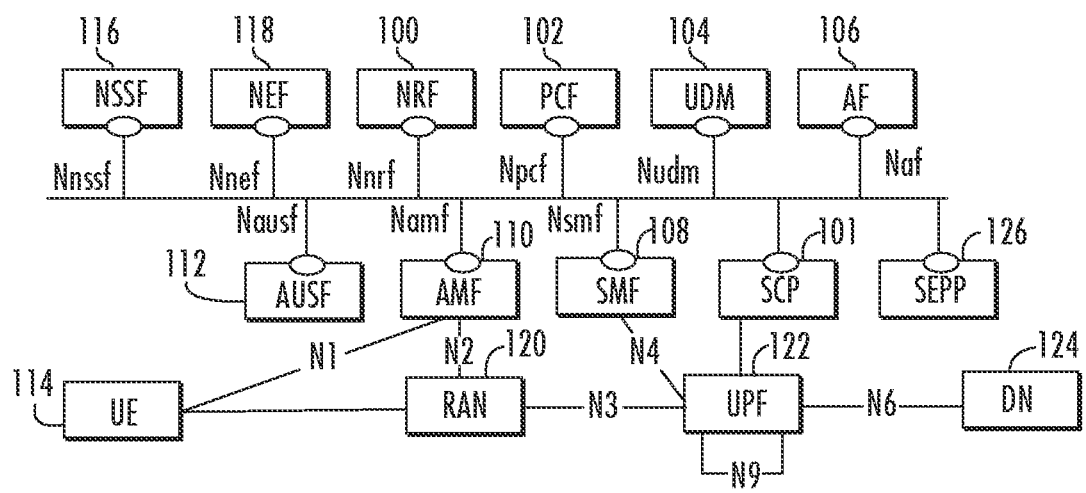
FIG. 1 is a network diagram illustrating an exemplary 5G system network architecture.

FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available producer NF service instances and their supported services and allow consumer NFs or SCPs to subscribe to and be notified of the registration of new/updated producer NF service instances. SCP 101 may also support service discovery and selection of producer NF instances. SCP 101 may perform load balancing of connections between consumer and producer NFs.

NRF 100 is a repository for NF or service profiles of producer NF instances. In order to communicate with a producer NF instance, a consumer NF or an SCP must obtain the NF or service profile of the producer NF instance from NRF 100. The NF or service profile is a JavaScript object notation (JSON) data structure defined in 3GPP TS 29.510. The NF or service profile definition includes at least one of a fully qualified domain name (FQDN), an Internet protocol (IP) version 4 (IPv4) address or an IP version 6 (IPv6) address.

In FIG. 1, any of the network functions can be consumer NFs, producer NFs, or both, depending on whether they are requesting, providing, or requesting and providing services. In the illustrated example, the NFs include a policy control function (PCF) 102 that performs policy related operations in a network, a user defined management (UDM) 104 that manages user data, and an application function (AF) 106 that provides application services.

The NFs illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN.

As stated above, one problem in 5G networks is that during NF discovery and selection, a consumer NF may fail to discovery and/or select the NF that is most optimized to provide a service. One possible reason for the failure to discover or select the most optimized NF is that the preferred locality attribute specified by the querying NF in the NF discovery request doesn't match any of the localities of NFs registered with the NRF. In another example, the preferred locality attribute in the NF discovery request matches the locality attribute of a registered NF, but that NF is unavailable. As a result, suboptimal producer NF selection can occur. During registration with the NRF, each producer NF can specify its locality as a registration attribute or parameter, which is stored by the NRF in a data structure referred to as an NF profile or NF profile object. The NF registration process is conducted according to 3GPP TS 29.510 where each NF sends an NF register message to NRF 100.

Figure 2:
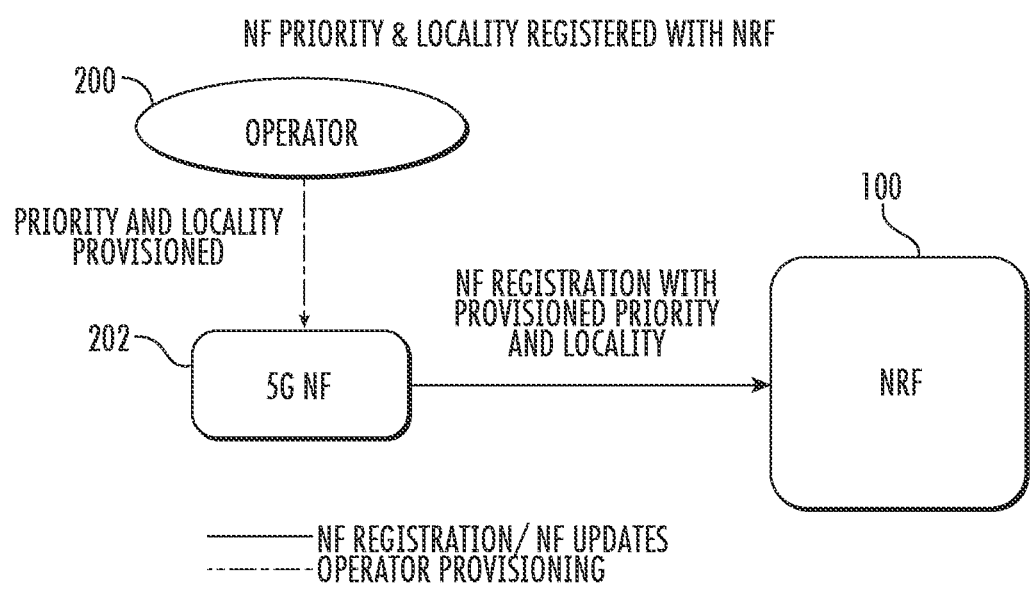
FIG. 2 is a network diagram illustrating operator provisioning of priority and locality at an NF and registration of the NF profile of the NF with the NRF.

FIG. 2 illustrates the NF registration process. In FIG. 2, a network operator 200 provisions a 5G NF 202 with a priority and a locality and other parameters that identify the NF and the service(s) it provides. 5G NF 202 registers its priority, locality, and other identifying parameters with NRF 100 by transmitting an NF register message including these parameters to NRF 100. Provided that NRF 100 accepts the registration, NRF 100 will store an NF profile message for NF 202 in the NF profiles database maintained by NRF 100. NRF 100 will allow other NFs to discover the NF profiles of NFs that are registered with NRF 100.

The NF register message includes the NF profile of the NF seeking registration. Table 6.1.6.2.2-1 of 3GPP TS 29.510 defines the attributes that may be included in an NF profile. Of interest to the subject matter described herein is the locality attribute of the NF profile. Table 1 shown below is an excerpt from Table 6.1.6.2.2-1 of 3GPP TS 29.510 illustrating the locality attribute.

TABLE 1

Locality Attribute of NF Profile

| Attribute name | Data type | P | Cardinality | Description |
|---|---|---|---|---|
| Locality | string | O | 0 . . . 1 | Operator defined information about the location of the NF instance (e.g. geographic location, data center) (NOTE 3) |

(NOTE 3):
A requester NF may use this information to select a NF instance (e.g. a NF instance preferably located in the same data center).

As illustrated by Table 1, the locality attribute stores operator-defined information about the location of an NF instance, such as geographic location and data center. According to Note 3 of Table 1, the locality attribute can be used during NF discovery to select a producer NF that is in the same data center as the requesting consumer NF. However, the consumer NF may not know the correct locality attribute to specify in a discovery request message, which can result in sub-optimal NF selection.

The preferred locality is an optional attribute that may be included in an NF discovery request message. Table 2 shown below is an excerpt from Table 6.2.3.2.3.1-1 of 3GPP TS 29.510 and indicates how the NRF processes the preferred locality attribute in an NF discovery request.

TABLE 2

NRF Processing of Preferred locality Attribute

| Attribute Name | Data Type | P | Cardinality | Description | Applicability |
|---|---|---|---|---|---|
| Preferred locality | String | O | 0 . . . 1 | Preferred target NF location (e.g. geographic location, data center). When present, the NRF shall prefer NF profiles with a locality attribute that matches the preferred locality. The NRF may return additional NFs in the response not matching the preferred target NF location, e.g. if no NF profile is found matching the preferred target NF location. The NRF should set a lower priority for any additional NFs on the response not matching the preferred target NF location than those matching the preferred target NF location. (NOTE 6) | |

From Table 2, when the preferred locality attribute is present, the NRF should prefer NF profiles with a locality attribute that matches the preferred locality in an NF discovery request. The NRF may also return additional NF profiles in the discovery response not matching the preferred locality, for example, if no NF profile is found matching the preferred locality. The NRF may also set a lower priority for additional NF profiles in the discovery response that do not match the preferred locality.

Thus, preferred locality is an optional attribute sent by consumer NFs during discovery that, when present, would be configured by the network operator to indicate a preferred location of a producer NF that would serve the consumer NF. Typically, the preferred locality of a consumer NF would be the locality of the consumer NF or the locality of a preferred producer NF. The NRF should set a less-preferred (higher in number according to the 3GPP-defined priority numbering scheme where lower priority numbers indicate more preferred priorities) priority for any additional NFs in a discovery response with a registered locality parameter that does not match the preferred locality identified in an NF discovery request. NF profiles that match the discovery request's search criteria will be ordered based on preferred locality and registered priority. As will be described in detail below, the list of NF profiles returned to the querying NF may not be optimally ordered with respect to the querying NF.

Figure 3:
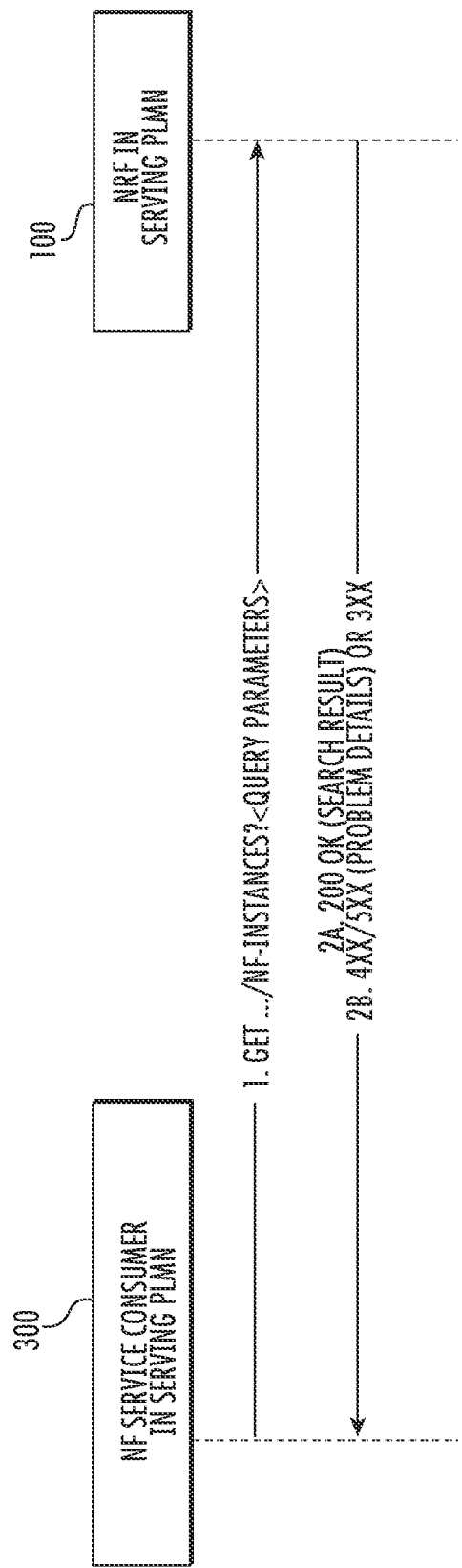
FIG. 3 is a message flow diagram illustrating exemplary messages exchanged between a consumer NF and an NRF during NF discovery.

FIG. 3 is a message flow diagram illustrating exemplary messages exchanged between an NF service consumer and an NRF in performing NF discovery. In line 1 of the message flow diagram illustrated in FIG. 3, NF service consumer 300 initiates the NF discovery process by sending and HTTP GET message to NRF 100. The HTTP GET message sent to the NRF to obtain service profiles of NF instances is also referred to as an NFDiscover request or NF discovery request. The HTTP GET message includes query parameters (such as NFtype) that the NRF uses to locate NF profiles of producer NFs that can provide the service identified by the query parameters or attributes. One such parameter or attribute is the preferred locality attribute. If NF service consumer 300 is capable of formulating and NF discover message with a preferred locality attribute that corresponds to a region within the PLMN of NRF 100, then the preferred locality attribute can be effectively used to select a producer NF that is closer to consumer NF 300 than other producer NFs. However, if NF service consumer 300 is incapable of including a preferred locality attribute that has meaning in the PLMN of NRF 100, NRF 100 may prioritize the list of NF profiles returned to consumer NF 300 in the discovery response based on registered producer NF priorities, which can result in suboptimal NF selection. In FIG. 3, it is assumed that consumer NF 300 is capable of inserting a preferred locality attribute in the NF discovery request in line 1 because consumer NF 300 and NRF 100 are in the same PLMN. However, even in this case, a producer NF having a locality that matches the preferred locality may be unavailable.

In lines 2A and 2B of the message flow diagram in FIG. 3A, if the NF discovery request is successfully processed, NRF 100 responds with a 200 OK message that includes NF profile objects corresponding to the NF profiles of producer NFs that are able to provide the service identified in the discovery request. If the NF discovery process is not successful, NRF 100 may return a 4xx or 5xx message with problem details.

If the NF discovery request is redirected to another NRF, NRF 100 will return a 3xx message. It should be noted that the subject matter described herein applies to NF discovery requests from an NRF in a PLMN serving a consumer NF to an NRF in a home PLMN, as detailed in Section 5.3.2.2.3 of 3GPP TS 29.510 and service discovery where an intermediate forwarding NRF receives the NF discovery request from the consumer NF and forwards the NF discovery request to the NRF in another network or region as detailed in Section 5.2.2.2.5 of 3GPP TS 29.510. The NRF that receives the forwarded NF discovery request performs the look up in the NF profiles database to extract NF profiles that match the query parameters in the NF discovery request.

Figure 4:
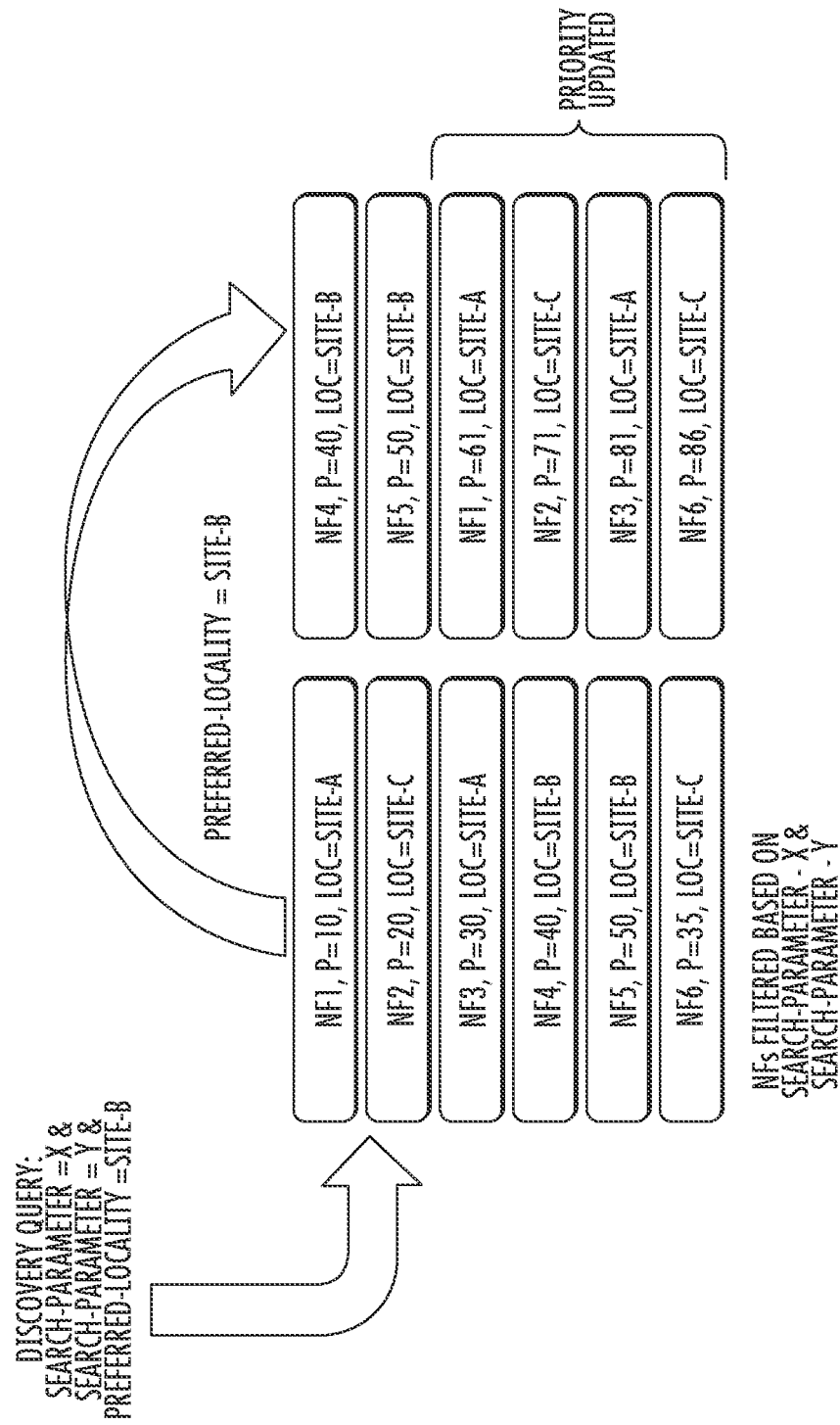
FIG. 4 is a flow diagram illustrating existing processing of NF discovery queries using a single preferred locality in the NF discovery request to set priorities of NF profiles in the NF discovery response.

FIG. 4 is a flow diagram illustrating existing processing of NF discovery queries using a single preferred locality in the NF discovery request to set priorities of NF profiles in the NF discovery response. In FIG. 4, the NF discovery request or query includes a preferred locality attribute, which in the illustrated example is site B. The NRF receives the discovery request and uses the search parameters X and Y to locate NF profiles of NFs that are capable of providing the service identified by parameters X and Y. In the illustrated example, the NRF identifies NFs NF1-NF6 as being capable of providing the requested service. The NRF uses the preferred locality parameter, site B, to update the priorities of the NF profiles such that NF profiles with a locality attribute of site B are prioritized over the NF profiles of other NFs in other localities. In the illustrated example, NFs NF4 and NF5 are prioritized over NF1, NF2, NF3, and NF6.

Figure 5:
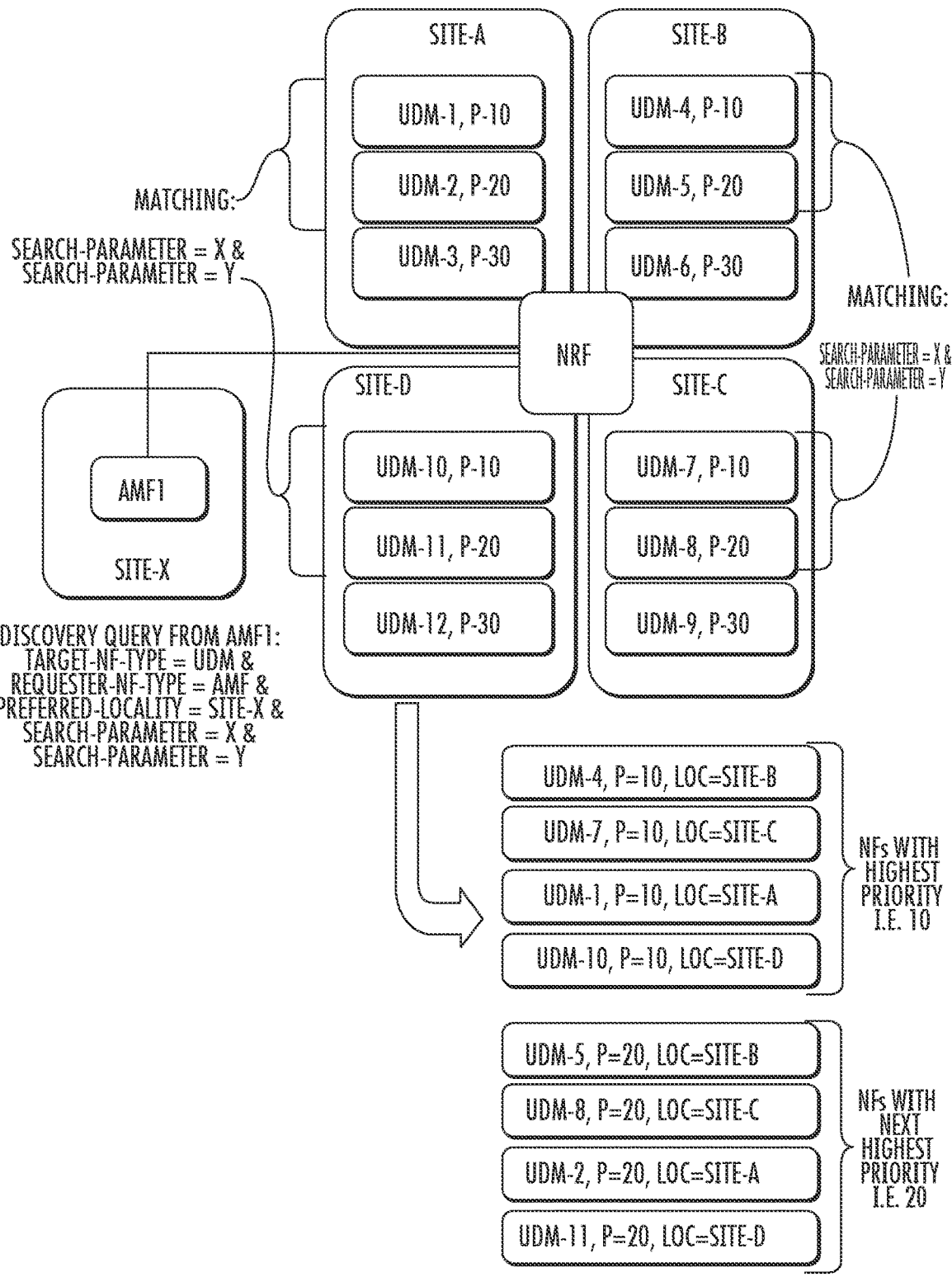
FIG. 5 is a diagram illustrating challenges associated with existing processing of NF discovery messages.

FIG. 5 is a diagram illustrating challenges associated with existing processing of NF discovery messages. Many deployments may not have target producer NF types deployed in the same location as consumer NFs. For example, In FIG. 5, AMF1 is deployed in site-X, and the UDMs that provide the services needed by AMF1 are deployed at sites A-D. In FIG. 5, it is assumed that site D is the most optimized or preferred site for consumer NFs in site X, sites A and C are the next most optimized or preferred sites from site X and are assumed to be equally preferred, and site B is the least optimized or preferred site from site X.

AMF1 in site X issues a discovery request to NRF 100. The preferred locality attribute in the discovery request identifies site X. NRF 100 determines that there are no UDMs with a locality matching the preferred locality attribute of site X specified in the discovery request. NRF 100 will return NF profiles of UDMs in other sites (i.e. locations-A/B/C/D) in the order of their configured NF priorities (and based on NF load when their NF priorities are the same). The configured NF priorities are the priorities set by the network operator and included in the NF profile stored with NRF 100 at the time of registration of each UDM with NRF 100.

One issue that can occur is that the NF profile of the highest priority producer NF received in the discovery response may not be the most optimized producer NF to serve the consumer NF. In FIG. 5, site D UDMs may be nearer to site X than UDMs in site A, site B and site C. However, NRF 100 may return NF profiles of UDMs from site A, site B and site C with higher priority than the NF profiles of UDMs in site D. In the illustrated example, the NF profile of UDM10 is returned with equal priority to the NF profiles of UDMs 1, 4, and 7, even though UDM10 is in a more preferred location than UDMs 1, 4, and 7. Similarly, the NF profile for UDM11 is returned with equal priority to the NF profiles of UDMs 2, 5, and 8, even though UDM11 is in a more preferred location that UDMs 2, 5, and 8.

A mechanism is needed to inform the NRF about the nearby locations given the preferred locality (i.e., the NF consumer's location) when an inter-PLMN discovery request arrives at the NRF with the preferred locality attribute set to the location of the querying NF in the V-PLMN. Such locations are useless to the NRF, as the NRF will not find any producer NF matching this locality. Another instance in which a mechanism to inform the NRF about the consumer NF's locality preferences is when the producer NF instances matching the query parameters and locality preference in the NF discovery request are unavailable In order to address these challenges, the subject matter described herein includes maintaining mappings of preferred locality attributes expected to be present in NF discovery requests and prioritized lists of preferred locations as part of NRF configuration. This mapping can be further granulized per {preferred locality and target-nf-type} tuple. That is, each list of preferred locations may be mapped to a combination of preferred locality and target NF type. The prioritized list of preferred locations can specify preferred sites in a desired order with respect to the relative preferences of the site represented by the preferred locality parameter to which the list is mapped.

Figure 6:
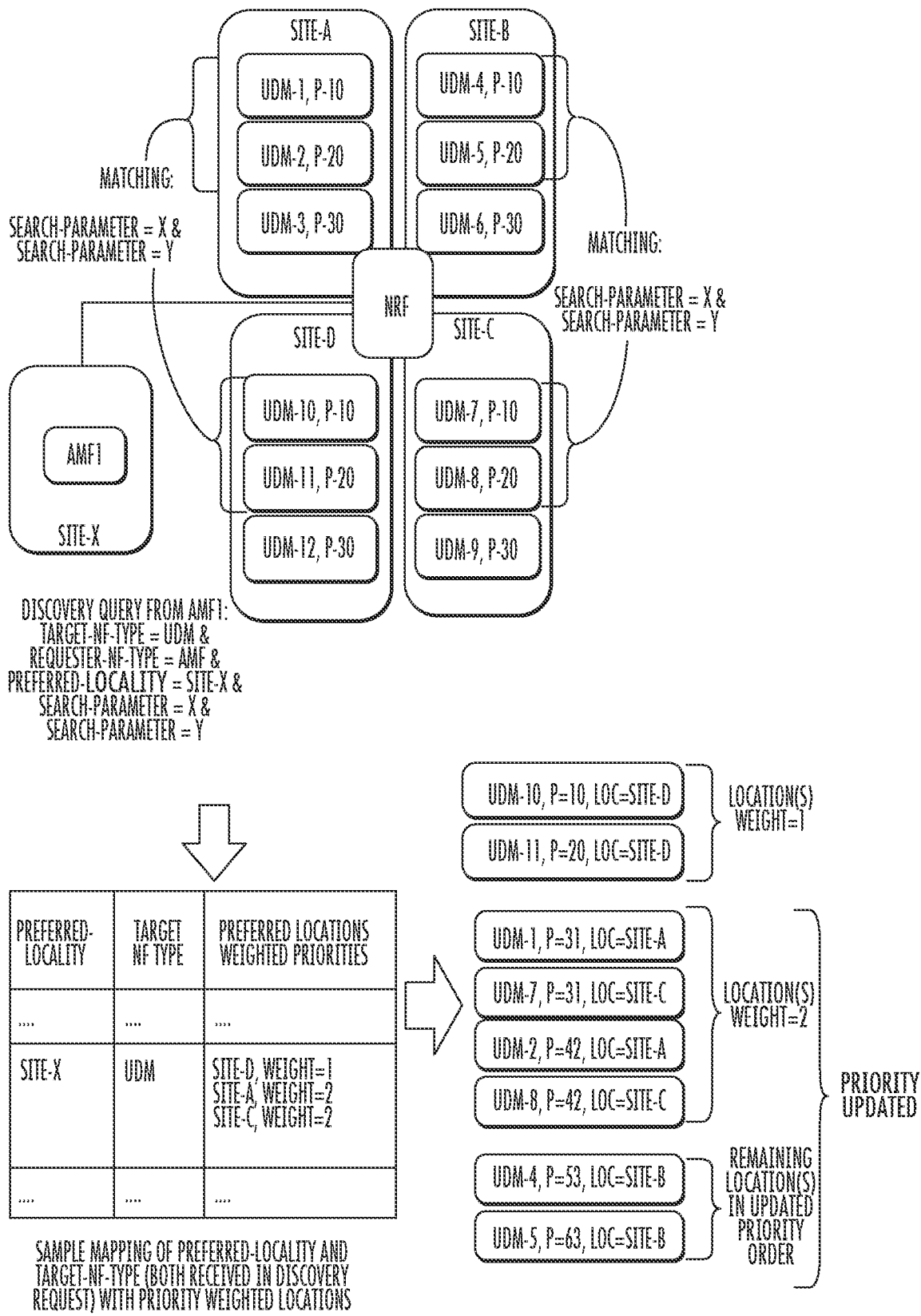
FIG. 6 is a network diagram illustrating an exemplary system and process for processing NF discovery requests at the NRF using mappings between preferred localities and prioritized lists of NF locations.

FIG. 6 is a network diagram illustrating an exemplary system and process for processing NF discovery requests at the NRF using mappings between preferred localities and prioritized lists of NF locations. In FIG. 6, the following locality preferences are assumed to apply:

site D (most optimized from site X),
sites A and C (equally optimized from site X), and
site B (least optimized from site X).

There may be multiple ways to assign relative preference values to the locations in each lists. In general, each location may be associated with a relative location preference indicator that indicates the relative preference (from the perspective of consumer NFs in the locality corresponding to the preferred locality attribute that maps to the list) of a location with respect to other locations in each list. In FIG. 6, the relative location preference indicators are weights assigned to each location that maps to the combination of site X and target NF type (the target NF type in FIG. 6 is UDM), where a lower weight value indicates a more preferred location. In another example, the relative location preference indicator may be a priority value used to indicate relative priorities of the locations in the list. In another example, the relative location preference indicator could be a location preference category, such as primary, secondary, tertiary, and remainder, to indicate the relative preferences of the locations mapped to the preferred locality attribute in the list.

In the illustrated example, AMF1 located in site X sends an NF discovery request to NRF 100. The NF discovery request includes query parameters X and Y and a preferred locality attribute identifying site X. Upon receiving the NF discovery request with "preferred locality" (and target-nf-type), Preferred locations with their configured relative location preference indicators are fetched. For example, NRF 100 may perform a lookup in a preferred locality attribute mappings database using the preferred NF locality and target NF type from the discovery request. The database may return a list of preferred locations that map to the preferred locality and target NF type. In FIG. 6, the result of the lookup in the preferred locality attribute mappings database is:

site D, weight=1,
site A, weigh=2, and
site C, weight=2.

NRF 100 uses the query parameters X and Y to perform a lookup in its NF profiles database to identify a list of NF profiles of NFs capable of providing the service matching the query parameters. In FIG. 5, it is assumed that UDMs 1 and 2 in site A, UDMs 4 and 5 in site B, UDMs 7 and 8 in site C, and UDMs 10 and 11 in site D match the query parameters. NRF 100 then uses the list of preferred locations and corresponding weights to set the relative priorities of the NF profiles to return to the querying NF. Site D is the most preferred site, so the NF profiles for UDMs 10 and 11 in site D are returned with the highest priority (which is indicated by the lowest priority attribute value). Sites A and C are the next most preferred sites with equal priority weight values. Accordingly, UDMs 1 and 7 in sites A and C are returned with the next highest priority, followed by UDMs 2 and 8 in sites A and C. It should be noted that the relative values of the configured NF priority in each site can also be used to order the NF profiles in the NF discovery response. The remaining NFs having NF profiles that match the query parameters are returned with priorities lower than those of the NFs whose locations are identified in the list. In FIG. 6, the NF profiles for UDMs 4 and 5 located in site B are returned with priorities lower than those of NF profiles for UDMs located at sites A, C, or D. In another enhancement, if the NF profiles of two NFs are determined to have equal priorities after using the weights to modify the priorities, the NF profiles may be prioritized according to relative loading, i.e., an NF with a lower processing load will be prioritized higher than an NF with a higher processing load.

Figure 7:
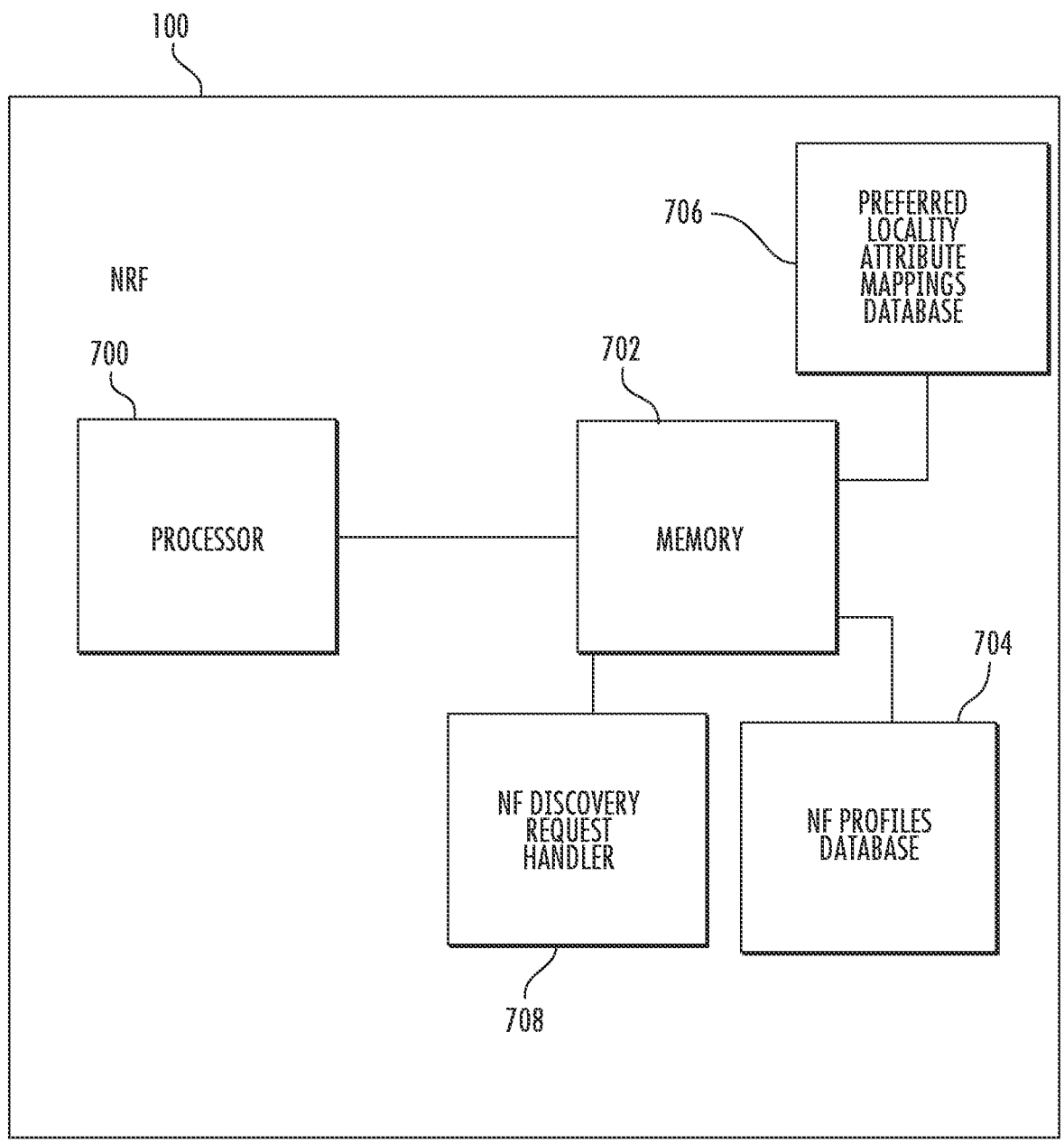
FIG. 7 is a block diagram illustrating an exemplary architecture for an NRF for processing NF discovery requests using mappings between preferred localities and prioritized lists of NF locations.

FIG. 7 is a block diagram illustrating an exemplary architecture for an NRF for processing NF discovery requests using mappings between preferred localities and prioritized lists of NF localities. Referring to FIG. 7, NRF 100 includes at least one processor 700 and a memory 702. NRF 100 further includes an NF profiles database 704 stored in memory 702 and that includes the NF profiles of producer NFs that are registered with NRF 100.

NRF 100 further includes a preferred locality attribute mappings database 706 stored in memory 702 that includes mappings between preferred locality attributes and prioritized lists of preferred locations. One example of such a mapping is the mapping between site X and the locations identified by the identifiers site A, site B, and site D and their associated weights illustrated in FIG. 6.

NRF 100 further includes an NF discovery request handler 708 implemented by processor 700. NF discovery request handler 708 may receive and process NF discovery requests from consumer NFs. For example, NF discovery request handler 708 may receive an NF discovery request including a preferred locality attribute and the preferred locality attribute to access preferred locality attribute mappings database 706 and obtain a prioritized list of preferred locations corresponding to the preferred locality attribute. NF discovery request handler may access NF profiles database 704 to identify NF profiles of producer NFs capable of providing a service indicated by query parameters in the NF discovery request. NF discovery request handler 708 may prioritize the NF profiles according to the prioritized list of preferred locations, generate an NF discovery response including the prioritized list of NF profiles, and transmit the NF discovery response to the NF that transmitted the NF discovery request. In one example, NF discovery request handler 708 may be implemented using computer executable instructions stored in memory 702 and executed by processor 700.

Figure 8:
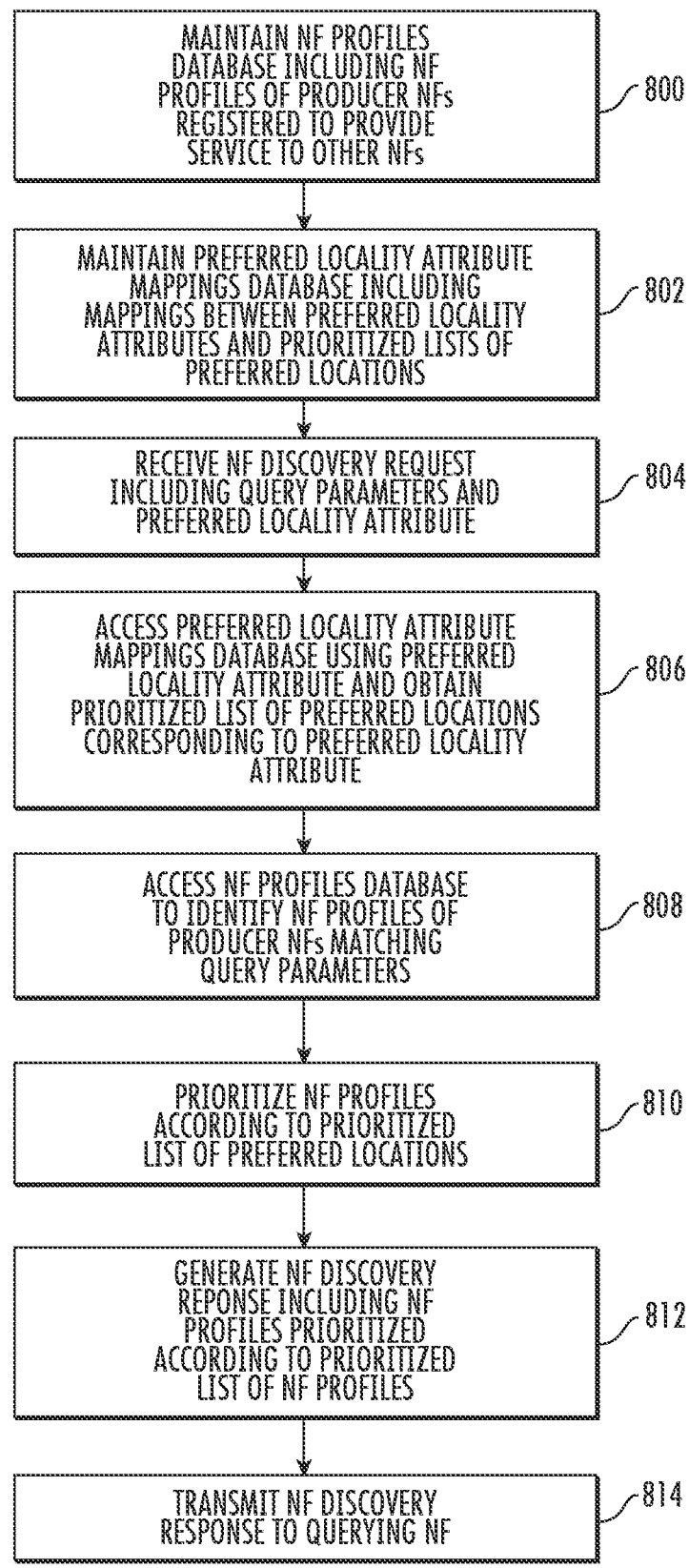
FIG. 8 is a flow chart illustrating an exemplary process implemented by an NRF for processing NF discovery requests using mappings between preferred localities and prioritized lists of NF locations.

FIG. 8 is a flow chart illustrating an exemplary process implemented by an NRF for processing NF discovery requests using mappings between preferred localities and prioritized lists of NF locations. Referring to FIG. 8, the process includes steps performed at an NRF including at least one processor. In step 800, the process includes maintaining an NF profiles database including NF profiles of producer NFs registered to provide service to other NFs. For example, NRF 100 may maintain NF profiles database 704 by storing the NF profiles of NFs that register with NRF 100 through the NF register service operation defined in 3GPP TS 29.510. Each NF profile may include a locality attribute and a priority attribute, that may be used by NRF 100 to prioritize NF profiles in NF discovery responses.

In step 802, the process includes maintaining a preferred locality attribute mappings database including mappings between preferred locality attributes and prioritized lists of preferred locations. For example, NRF 100 may be configured with preferred locality attribute mappings database 706 that includes mappings between preferred locality attributes and prioritized lists of preferred locations corresponding to the preferred locality attributes. An example of such a mapping is the mapping between the locality attribute site X and the locations site A, site C, and site D illustrated in FIG. 6. The mappings may be configured per target NF type, as also illustrated in FIG. 6. The mappings may include weights, priorities, location categories, or other indicators of the relative preferences of the locations from the perspective of consumer NFs that generate NF discovery requests including the preferred locality attributes.

In step 804, the process includes receiving, from an NF, an NF discovery request including a preferred locality attribute. For example, NRF 100 may received an inter-PLMN or intra-PLMN NF discovery request from a consumer NF or an NRF. The NF discovery request may include a preferred locality attribute and query parameters that identify the target NF type requested by the NF discovery request.

In step 806, the process includes using the preferred locality attribute to access the preferred locality attribute mappings database and obtain a prioritized list of preferred locations. For example, NRF 100 may perform a lookup in preferred locality attribute mappings database 706, identify a database record corresponding to the preferred locality attribute and target NF type, and obtain a prioritized list of locations from the record.

In step 808, the process includes accessing the NF profiles database to identify NF profiles of producer NFs capable of providing a service indicated by query parameters in the NF discovery request. For example, NRF 100 may access NF profiles database 704 using query parameters from the NF discovery request and locate NF profiles matching the query parameters.

In step 810, the process includes prioritizing the NF profiles according to the prioritized list of preferred locations. For example, NRF 100 may use the weights associated with the locations from the prioritized list of locations obtained from preferred locality attribute mappings database 706 to modify the configured priorities of the producer NFs in the NF profiles. Modifying the configured priorities may include changing the configured priority attribute values in the NF profiles such that NF profiles having a locality attribute matching one of the preferred locations in the prioritized list are prioritized higher (with a lower priority attribute value) than NF profiles that do not match one of the preferred locations. In addition, modifying the configured priorities may also include changing the configured priority attribute values such that NF profiles having locality attributes matching different ones of the preferred locations in the list are prioritized according to relative weights associated with the different locations in the list. For example, if the NF profile for NF1 has a locality that matches site A, and site A has a weight of 1, and the NF profile for NF2 has a locality that matches site B, and site B has a weight of 2, the priority attribute value for the NF profile for NF1 may be set to a lower (more preferred) value than the priority attribute value for NF2.

It should be noted that the NRF may adjust the configured priority attribute values of NF profiles of NFs matching with different ones of the preferred locations independently of the original configured priority attribute values and consistently with the location preference indicators. For example, assuming NF1 has a locality that matches site A, weight=1, and NF2 has a locality that matches site B, weight=2, the priority attribute value for NF1 will be set to be lower than the priority attribute value of NF2 regardless of the configured priority attribute values of NF1 and NF2.

It should also be noted that the configured priority attribute values of NF1 and NF2 may be used in setting the relative priority attribute values of NF1 and NF2 if NF1 and NF2 each have a locality attribute that matches the same location in the prioritized list. For example, if NF1 and NF2 are both in site A, have configured priority attribute values of 8 and 10, and site A is one of the locations in the prioritized list, the priority attribute values for NF1 and NF2 may be modified to 4 and 5, for example, which maintains the relative priority of NF1 and NF2 with respect to each other.

In step 812, the process includes generating an NFDiscover response including the NF profiles prioritized according to the prioritized list of preferred locations. For example, NRF 100 may generate the NF discovery response including NF profiles with attributes that match the query parameters and that are prioritized according to the weights obtained from the prioritized list of preferred locations.

In step 814, the process includes transmitting the NFDiscover response to the NF that transmitted the NF discovery request. For example, NRF 100 may transmit the NF discovery response to the NF that sent the NF discovery request. The querying NF may be a consumer NF, an NRF, or an SCP, depending on the communication model being implemented in the NF discovery transaction.

Advantages of the subject matter described herein include enhanced NF discovery for both inter-PLMN and intra-PLMN discovery requests. Because the NF profiles in the list of NF profiles returned to the requesting consumer NF are prioritized according to the prioritized list of preferred locations, the consumer NF is more likely to select a producer NF to provide service that is closer to the consumer NF, resulting in more efficient service messaging in the network.

The disclosure of each of the following references is hereby incorporated herein by reference in its entirety.
References
1. 3$^{rd}$ Generation Partnership Project; Technical Specification Group Services and System Aspects; System architecture for the 5G System (5GS); Stage 2 (Release 17) 3GPP TS 23.501 V17.0.0 (2021-03).
2. 3$^{rd}$ Generation Partnership Project; Technical Specification Group Core Network and Terminals; 5G System; Network Function Repository Services; Stage 3 (Release 17) 3GPP TS 29.510 V17.1.0 (2021-03).

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for processing network function (NF) discovery requests using prioritized lists of preferred locations, the method comprising:

at an NF repository function (NRF) including at least one processor:

maintaining an NF profiles database including NF profiles of producer NFs registered to provide service to other NFs, wherein the NF profiles include configured priority attribute values for the producer NFs;

maintaining a preferred locality attribute mappings database including mappings between preferred locality attributes and prioritized lists of preferred locations;

receiving, from an NF, an NF discovery request including query parameters and a preferred locality attribute;

accessing the preferred locality attribute mappings database using the preferred locality attribute and obtaining a prioritized list of preferred locations corresponding to the preferred locality attribute, wherein the prioritized list includes weight values for the preferred locations, wherein the weight values indicate relative preferences of locations mapped to a preferred locality attribute and target NF type identified in the NF discovery request;

accessing the NF profiles database using the query parameters and identifying NF profiles of producer NFs capable of providing a service indicated by the query parameters;

prioritizing the NF profiles according to the prioritized list of preferred locations, wherein prioritizing the NF profiles includes identifying NF profiles having locality attributes corresponding to preferred locations in the prioritized list and producing updated priority attribute values using the weight values, wherein producing the updated priority attribute values includes:

setting the updated priority attribute values for NF profiles having locality attributes corresponding to values of the weights indicating more preferred locations to be lower than the updated priority attribute values of NF profiles having locality attributes corresponding to values of the weights indicating less preferred locations;

setting the updated priority attribute values for the NF profiles having locality attributes corresponding to the same values of the weights to maintain relative priority relationships specified by the configured priority attribute values in the NF profiles of the producer NFs; and setting the updated priority attribute values includes applying the same weight value to modify priority attribute values of NF profiles of the producer NFs at the same site with different priority attribute values; and transmitting an NF discovery response to the NF that transmitted the NF discovery request, wherein the NF discovery response includes the NF profiles with the updated priority attribute values.

2. The method of claim 1 wherein a weight for a preferred location that matches the preferred locality is lower than a weight for a preferred location that does not match the preferred locality.

3. The method of claim 1 wherein receiving the NF discovery request includes receiving an inter-public land mobile network (PLMN) NF discovery request.

4. The method of claim 1 wherein receiving the NF discovery request includes receiving an intra-public land mobile network (PLMN) NF discovery request.

5. A system for processing network function (NF) discovery requests using prioritized lists of preferred locations, the system comprising:

an NF repository function (NRF) including at least one processor and a memory;

an NF profiles database stored in the memory and including NF profiles of producer NFs registered to provide service to other NFs, wherein the NF profiles include configured priority attribute values for the producer NFs;

a preferred locality attribute mappings database stored in the memory and including mappings between preferred locality attributes and prioritized lists of preferred locations; and an NF discovery request handler executable by the at least one processor for receiving, from an NF, an NF discovery request including query parameters and a preferred locality attribute, accessing the preferred locality attribute mappings database using the preferred locality attribute and obtaining a prioritized list of preferred locations corresponding to the preferred locality attribute, wherein the prioritized list includes weight values for the preferred locations, wherein the weight values indicate relative preferences of locations mapped to a preferred locality attribute and target NF type identified in the NF discovery request, the NF discovery request handler for accessing the NF profiles database using the query parameters and identifying NF profiles of producer NFs capable of providing a service indicated by the query parameters, prioritizing the NF profiles according to the prioritized list of preferred locations, generating an NF discovery response including the NF profiles prioritized according to the prioritized list of preferred locations, and transmitting an NF discovery response to the NF that transmitted the NF discovery request, wherein prioritizing the NF profiles includes identifying NF profiles having locality attributes corresponding to preferred locations in the prioritized list and producing updated priority attribute values using the weight values, wherein producing the updated priority attribute values includes:

setting the updated priority attribute values for NF profiles having locality attributes corresponding to values of the weights indicating more preferred locations to be lower than the updated priority attribute values of NF profiles having locality attributes corresponding to values of the weights indicating less preferred locations;

setting the updated priority attribute values for the NF profiles having locality attributes corresponding to the same values of the weights to maintain relative priority relationships specified by the configured priority attribute values in the NF profiles of the producer NFs; and setting the updated priority attribute values includes applying the same weight value to modify priority attribute values of NF profiles of the producer NFs at the same site with different priority attribute values.

6. The system of claim 5 wherein a weight for a preferred location that matches the preferred locality is lower than a weight for a preferred location that does not match the preferred locality.

7. The system of claim 5 wherein the NF discovery request comprises an inter-public land mobile network (PLMN) NF discovery request or an intra-PLMN NF discovery request.

8. A non-transitory computer readable medium having stored thereon executable instructions that when executed by a processor of a computer control the computer to perform steps comprising:

at a network function (NF) repository function (NRF):

maintaining an NF profiles database including NF profiles of producer NFs registered to provide service to other NFs, wherein the NF profiles include configured priority attribute values for the producer NFs;

maintaining a preferred locality attribute mappings database including mappings between preferred locality attributes and prioritized lists of preferred locations;

receiving, from an NF, an NF discovery request including query parameters and a preferred locality attribute;

accessing the preferred locality attribute mappings database using the preferred locality attribute and obtaining a prioritized list of preferred locations corresponding to the preferred locality attribute, wherein the prioritized list includes weight values for the preferred locations, wherein the weight values indicate relative preferences of locations mapped to a preferred locality attribute and target NF type identified in the NF discovery request;

accessing the NF profiles database using the query parameters and identifying NF profiles of producer NFs capable of providing a service indicated by the query parameters;

prioritizing the NF profiles according to the prioritized list of preferred locations, wherein prioritizing the NF profiles includes identifying NF profiles having locality attributes corresponding to preferred locations in the prioritized list and producing updated priority attribute values using the weight values, wherein producing the updated priority attribute values includes:

setting the updated priority attribute values for NF profiles having locality attributes corresponding to values of the weights indicating more preferred locations to be lower than the updated priority attribute values of NF profiles having locality attributes corresponding to values of the weights indicating less preferred locations;

setting the updated priority attribute values for the NF profiles having locality attributes corresponding to the same values of the weights to maintain relative priority relationships specified by the configured priority attribute values in the NF profiles of the producer NFs; and setting the updated priority attribute values includes applying the same weight value to modify priority attribute values of NF profiles of the producer NFs at the same site with different priority attribute values; and transmitting an NF discovery response to the NF that transmitted the NF discovery request, wherein the NF discovery response includes the NF profiles with the updated priority attribute values.

* * * * *